United States Patent
Kraft

(10) Patent No.: US 10,652,273 B2
(45) Date of Patent: May 12, 2020

(54) MITIGATION OF ANTI-SANDBOX MALWARE TECHNIQUES

(71) Applicant: Sophos Limited, Abingdon (GB)

(72) Inventor: Chris Douglas Kraft, Vancouver (CA)

(73) Assignee: Sophos Limited, Abingdon (GB)

( * ) Notice: Subject to any disclaimer, the term of this patent is extended or adjusted under 35 U.S.C. 154(b) by 0 days.

(21) Appl. No.: 15/906,383

(22) Filed: Feb. 27, 2018

(65) Prior Publication Data
US 2018/0191739 A1   Jul. 5, 2018

Related U.S. Application Data

(63) Continuation of application No. 14/929,966, filed on Nov. 2, 2015, now Pat. No. 9,942,263.

(60) Provisional application No. 62/243,720, filed on Oct. 20, 2015.

(51) Int. Cl.
| | | |
|---|---|---|
| G06F 21/00 | (2013.01) | |
| H04L 29/06 | (2006.01) | |
| G06F 21/53 | (2013.01) | |
| G06F 21/56 | (2013.01) | |
| G06F 21/57 | (2013.01) | |

(52) U.S. Cl.
CPC ............ *H04L 63/145* (2013.01); *G06F 21/53* (2013.01); *G06F 21/562* (2013.01); *G06F 21/563* (2013.01); *G06F 21/564* (2013.01); *G06F 21/565* (2013.01); *G06F 21/566* (2013.01); *G06F 21/577* (2013.01); *H04L 63/0236* (2013.01); *H04L 63/1416* (2013.01); *G06F 2221/033* (2013.01)

(58) Field of Classification Search
CPC ...... G06F 21/566; G06F 21/562; G06F 21/53; G06F 21/56; G06F 21/565; G06F 21/563; G06F 21/564; G06F 2221/033; H04L 63/1416; H04L 63/1433; H04L 63/1441; H04L 63/0236; H04L 63/145
See application file for complete search history.

(56) References Cited

U.S. PATENT DOCUMENTS

| | | | |
|---|---|---|---|
| 8,001,606 | B1 | 8/2011 | Spertus et al. |
| 8,510,838 | B1 * | 8/2013 | Sun .................. G06F 21/53 713/150 |
| 8,516,586 | B1 | 8/2013 | Jensen et al. |
| 8,621,625 | B1 | 12/2013 | Bogorad et al. |
| 9,104,870 | B1 * | 8/2015 | Qu .................. G06F 21/563 |
| 9,111,089 | B1 | 8/2015 | Bhatia et al. |
| 9,165,142 | B1 | 10/2015 | Wang et al. |
| 9,171,160 | B2 | 10/2015 | Vincent et al. |

(Continued)

OTHER PUBLICATIONS

USPTO, "U.S. Appl. No. 14/929,851 Final Office Action dated Dec. 29, 2017", 19 pages.

(Continued)

*Primary Examiner* — Yogesh Paliwal
(74) *Attorney, Agent, or Firm* — Strategic Patents, P.C.

(57) ABSTRACT

Static analysis is applied to unrecognized software objects in order to identify and address potential anti-sandboxing techniques. Where static analysis suggests the presence of any such corresponding code, the software object may be forwarded to a sandbox for further analysis. In another aspect, multiple types of sandboxes may be provided, with the type being selected according to the type of exploit suggested by the static analysis.

17 Claims, 5 Drawing Sheets

(56) References Cited

U.S. PATENT DOCUMENTS

| | | | |
|---|---|---|---|
| 9,355,246 | B1 | 5/2016 | Chen et al. |
| 9,430,646 | B1 | 8/2016 | Rosenberry et al. |
| 2008/0155691 | A1* | 6/2008 | Fossen ............... G06F 21/562 726/22 |
| 2013/0276122 | A1 | 10/2013 | Sowder et al. |
| 2014/0007222 | A1* | 1/2014 | Qureshi ............... G06F 21/10 726/16 |
| 2014/0283065 | A1* | 9/2014 | Teddy ............... H04L 63/145 726/23 |
| 2015/0161381 | A1 | 6/2015 | Sun et al. |
| 2016/0057159 | A1 | 2/2016 | Yin et al. |
| 2016/0292420 | A1* | 10/2016 | Langton ............ G06F 21/566 |
| 2016/0330215 | A1* | 11/2016 | Gafni ................. H04L 63/14 |
| 2017/0109528 | A1 | 4/2017 | Harris et al. |
| 2017/0109529 | A1 | 4/2017 | Kraft |
| 2017/0111374 | A1 | 4/2017 | Harris et al. |

OTHER PUBLICATIONS

USPTO, "U.S. Appl. No. 14/929,910 Notice of Allownace dated Nov. 2, 2017", 14 pages.

USPTO, "U.S. Appl. No. 14/929,851, Non-Final Office Action dated May 8, 2017", 16 pages.

USPTO, "U.S. Appl. No. 14/929,910, Non-Final Office Action dated Feb. 9, 2017", 11 pages.

USPTO, "U.S. Appl. No. 14/929,966, Non-Final Office Action dated Feb. 16, 2017", 10 pages.

USPTO, "U.S. Appl. No. 14/929,966, Notice of Allowance dated Dec. 12, 2017", 10 pages.

EPO, "PCT Application No. PCT/GB2016/053221—International Search Report and Written Opinion dated Dec. 7, 2016", 13 pages.

UKIPO, "UK Application No. 1610600.7 Search and Examination Report dated Oct. 14, 2016", 6 pages.

USPTO, "U.S. Appl. No. 14/929,851 Notice of Allowance dated Jun. 15, 2018", 9 pages.

USPTO, "U.S. Appl. No. 14/929,851 Notice of Allowance dated Jul. 12, 2018", 12 pages.

IPO, "GB Application No. 1805907.1 Examination Report dated Jun. 5, 2018", 3 pages.

WIPO, "PCT Application No. PCT/GB2016/053221 International Preliminary Report on Patentability dated May 3, 2018", 10 pages.

IPO, "UK Application No. 1610600.7 Examination Report dated Jul. 4, 2019", 3 pages.

UKIPO, "UK Application No. 1805907.1 Examination Report dated Jun. 28, 2019", 3 pages.

UKIPO, "UK Application No. 1610600.7 Examination Report dated Sep. 19, 2019", 2 pages.

* cited by examiner

MITIGATION OF ANTI-SANDBOX MALWARE TECHNIQUES

CROSS-REFERENCE TO RELATED APPLICATIONS

This application is a continuation of U.S. patent application Ser. No. 14/929,966, filed Nov. 2, 2015, which claims the benefit of U.S. Provisional Patent Application No. 62/243,720, filed Oct. 20, 2015, with the entire contents of each of these applications hereby incorporated herein by reference.

TECHNICAL FIELD

This application relates to the use of static analysis to detect and mitigate anti-sandbox techniques.

BACKGROUND

One computer security technique for dealing with unidentified and potentially harmful code is to execute the code in a sandbox where the behavior of the code can be observed without exposing a user or computer system to any harmful effects. As malware has become more sophisticated, anti-sandbox techniques have emerged in which, when malware detects that it is executing in a sandbox environment, the malware delays execution of harmful code in order to avoid detection.

There remains a need for improved malware detection that works around these anti-sandboxing techniques in order to properly characterize otherwise unidentified code.

SUMMARY

Static analysis is applied to unrecognized software objects in order to identify and address potential anti-sandboxing techniques. Where static analysis suggests the presence of any such corresponding code, the software object may be forwarded to a sandbox for further analysis. In another aspect, multiple types of sandboxes may be provided, with the type being selected according to the type of exploit suggested by the static analysis.

BRIEF DESCRIPTION OF THE FIGURES

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

Figure 1:
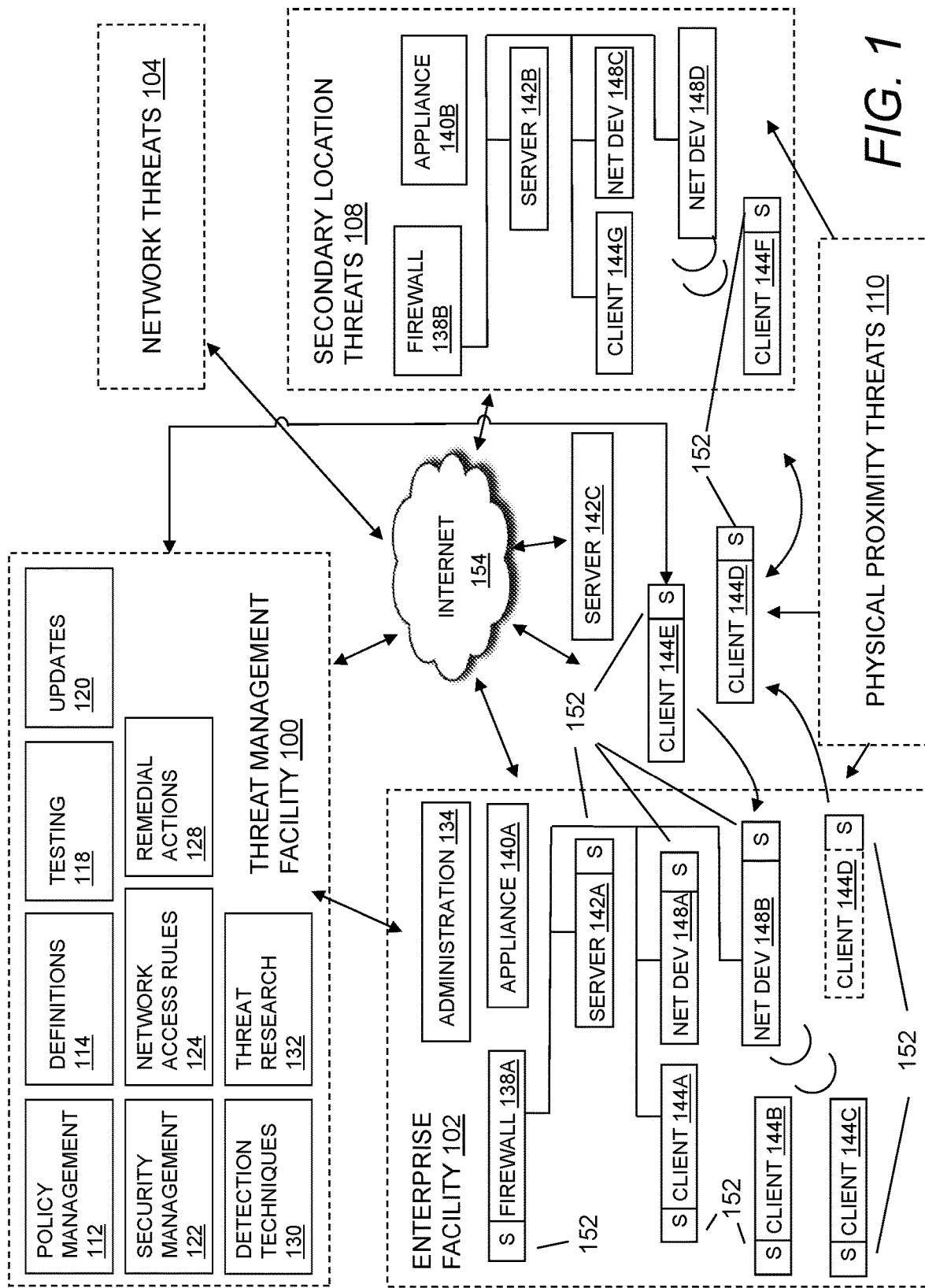
FIG. 1 illustrates an environment for threat management.

The embodiments will now be described more fully hereinafter with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "third," "above," "below," and the like, are words of convenience and are not to be construed as limiting terms unless expressly state otherwise.

While techniques described herein may emphasize certain network security techniques using firewalls and the like, it will be appreciated that the disclosed systems and methods may be more generally applicable in a wide variety of contexts, including contexts related to security and contexts outside of the realm of network security. In general, the techniques disclosed herein may be usefully employed in any context where a need arises for determining domain names from an Internet Protocol (IP) address. As such, the scope of this disclosure is not limited by the context and examples provided herein, but is intended to include any other adaptations or uses of the disclosed techniques that might be apparent to one of ordinary skill in the art.

An environment for threat management where the devices, systems, and methods discussed herein may be utilized will now be described.

FIG. 1 illustrates an environment for threat management. Specifically, FIG. 1 depicts a block diagram of a threat management system providing protection to an enterprise against a plurality of threats. One aspect relates to corporate policy management and implementation through a unified threat management facility 100. As will be explained in more detail below, a threat management facility 100 may be used to protect computer assets from many threats, both computer-generated threats and user-generated threats. The threat management facility 100 may be multi-dimensional in that it may be designed to protect corporate assets from a variety of threats and it may be adapted to learn about threats in one dimension (e.g. worm detection) and apply the knowledge in another dimension (e.g. spam detection). Policy management is one of the dimensions for which the threat management facility can provide a control capability. A corporation or other entity may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services, and policy management may be offered as one of the services. We will now turn to a description of certain capabilities and components of the threat management system 100.

Over recent years, malware has become a major problem across the Internet 154. From both a technical perspective and a user perspective, the categorization of a specific threat type, whether as virus, worm, spam, phishing exploration, spyware, adware, or the like, is becoming reduced in significance. The threat, no matter how it is categorized, may need to be stopped at various points of a networked computing environment, such as one of an enterprise facility 102, including at one or more laptops, desktops, servers, gateways, communication ports, handheld or mobile devices, firewalls, and the like. Similarly, there may be less and less benefit to the user in having different solutions for known and unknown threats. As such, a consolidated threat management facility 100 may need to apply a similar set of technologies and capabilities for all threats. In certain embodiments, the threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have led to a rapid increase in the speed at which threats may move. Today, an unprotected PC connected to the Internet 154 may be infected quickly (perhaps within 10 minutes) which may require acceleration for the delivery of threat protection. Where once monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility 100 providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations, and may include administration 134, a firewall 138A, an appliance 140A, server 142A, network devices 148A-B, clients 144A-D, such as protected by computer security facilities 152, and the like. It will be understood that any reference herein to client facilities may include the clients 144A-D shown in FIG. 1 and vice-versa. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include clients 144D (or client facilities) that have moved into network connectivity not directly associated or controlled by the enterprise facility 102. Threats to client facilities may come from a plurality of sources, such as from network threats 104, physical proximity threats 110, secondary location threats 108, and the like. Clients 144A-D may be protected from threats even when the client 144A-D is not located in association with the enterprise 102, such as when a client 144E-F moves in and out of the enterprise facility 102, for example when interfacing with an unprotected server 142C through the Internet 154, when a client 144F is moving into a secondary location threat 108 such as interfacing with components 140B, 142B, 148C, 148D that are not protected, and the like. In embodiments, the threat management facility 100 may provide an enterprise facility 102 protection from a plurality of threats to multiplatform computer resources in a plurality of locations and network configurations, with an integrated system approach.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, reputation-based filtering, control of unauthorized users, control of guest and non-compliant computers, and the like. The security management facility 122 may be a software application that may provide malicious code and malicious application protection to a client facility computing resource. The security management facility 122 may have the ability to scan the client facility files for malicious code, remove or quarantine certain applications and files, prevent certain actions, perform remedial actions and perform other security measures. In embodiments, scanning the client facility may include scanning some or all of the files stored to the client facility on a periodic basis, scanning an application when the application is executed, scanning files as the files are transmitted to or from the client facility, or the like. The scanning of the applications and files may be performed to detect known malicious code or known unwanted applications. In an embodiment, new malicious code and unwanted applications may be continually developed and distributed, and updates to the known code database may be provided on a periodic basis, on a demand basis, on an alert basis, or the like.

In an embodiment, the security management facility 122 may provide for email security and control, where security management may help to eliminate spam, viruses, spyware and phishing, control of email content, and the like. The security management facility's 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide Internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

In an embodiment, the security management facility 122 may provide for host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running. Whereas runtime protection may only interrupt code that has already partly executed, behavioral protection can identify malicious code at the gateway or on the file servers and delete the code before it can reach endpoint computers and the like.

In an embodiment, the security management facility 122 may provide for reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

In an embodiment, the security management facility 122 may provide for the overall security of the enterprise facility 102 network or set of enterprise facility 102 networks, may provide updates of malicious code information to the enterprise facility 102 network, and associated client facilities. The updates may include a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or the like. The security management facility 122 may include the management of receiving malicious code descriptions from a provider, distribution of malicious code descriptions to enterprise facility 102 networks, distribution of malicious code descriptions to client facilities, or the like.

The threat management facility 100 may provide a policy management facility 112 that may be able to block non-malicious applications, such as VoIP, instant messaging, peer-to-peer file-sharing, and the like, that may undermine productivity and network performance within the enterprise facility 102. The policy management facility 112 may be a set of rules or policies that may indicate enterprise facility 102 access permissions for the client facility, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility. The policy management facility 112 may include rules that may be interpreted with respect to an enterprise facility 102 network access request to determine if the request should be allowed. The rules may provide a generic rule for the type of access that may be granted. The rules may be related to the policies of an enterprise facility 102 for access rights for the enterprise facility's 102 client facility. For example, there may be a rule that does not permit access to sporting websites. When a website is requested by the client facility, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the addition of enterprise facility 102 wide access rules and policies that may be distributed to maintain control of client facility access to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM activity to only support personnel for communicating with customers. This may allow communication for departments requiring access, but may maintain the network bandwidth for other activities by restricting the use of IM to only the personnel that need access to instant messaging (IM) in support of the enterprise facility 102. In an embodiment, the policy management facility 112 may be a stand-alone application, may be part of the network server facility 142, may be part of the enterprise facility 102 network, may be part of the client facility, or the like.

In embodiments, the threat management facility 100 may provide configuration management, which may be similar to policy management, but may specifically examine the configuration set of applications, operating systems, hardware, and the like, and manage changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

In embodiments, the threat management facility 100 may also provide for the removal of applications that may interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a sometimes quickly evolving malware environment may require timely updates, and thus an update management facility 120 may be provided by the threat management facility 100. In addition, a policy management facility 112 may also require update management (e.g., as provided by the update facility 120 herein described). The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or client facility, the enterprise facility 102 network and/or client facility may pull information from the security facility 122 and policy management facility 112 network server facilities 142, there may be a combination of pushing and pulling of information between the security facility 122 and the policy management facility 112 network servers 142, enterprise facility 102 network, and client facilities, or the like. For example, the enterprise facility 102 network and/or client facility may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility by providing notification that there are updates available for download and then transmitting the information. The combination of the security management 122 network server facility 142 and security update module may function substantially the same as the policy management facility 112 network server and policy update module by providing information to the enterprise facility 102 network and the client facility in a push or pull method. In an embodiment, the policy management facility 112 and the security facility 122 management update modules may work in concert to provide information to the enterprise facility's 102 network and/or client facility for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The virus identity (IDE) definition files may provide information that may identify malicious code within files, applications, or the like. The definition files may be accessed by security management facility 122 when scanning files or applications within the client facility for the determination of malicious code that may be within the file or application. The definition files may contain a number of commands, definitions, or instructions, to be parsed and acted upon, or the like. In embodiments, the client facility may be updated with new definition files periodically to provide the client facility with the most recent malicious code definitions; the updating may be performed on a set time period, may be updated on demand from the client facility, may be updated on demand from the network, may be updated on a received malicious code alert, or the like. In an embodiment, the client facility may request an update to the definition files from an update facility 120 within the network, may request updated definition files from a computing facility external to the network, updated definition files may be provided to the client facility 114 from within the network, definition files may be provided to the client facility from an external computing facility from an external network, or the like.

In an embodiment, a definition management facility 114 may provide for the timely updates of definition files information to the network, client facilities, and the like. New and altered malicious code and malicious applications may be continually created and distributed to networks worldwide. The definition files that maintain the definitions of the malicious code and malicious application information for the protection of the networks and client facilities may need continual updating to provide continual defense of the network and client facility from the malicious code and malicious applications. The definition files management may provide for automatic and manual methods of updating the definition files. In embodiments, the network may receive definition files and distribute the definition files to the network client facilities, the client facilities may receive the definition files directly, or the network and client facilities may both receive the definition files, or the like. In an embodiment, the definition files may be updated on a fixed periodic basis, on demand by the network and/or the client facility, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide for a way to control access to the enterprise facility 102 networks. For instance, the enterprise facility 102 may want to restrict access to certain applications, networks, files, printers, servers, databases, or the like. In addition, the enterprise facility 102 may want to restrict user access under certain conditions, such as the user's location, usage history, need to know, job position, connection type, time of day, method of authentication, client-system configuration, or the like. Network access rules may be developed by the enterprise facility 102, or pre-packaged by a supplier, and managed by the threat management facility 100 in conjunction with the administration facility 134. Network access rules and control may be responsible for determining if a client facility application should be granted access to a requested network location. The network location may be on the same network as the facility or may be on another network. In an embodiment, the network access control may verify access rights for client facilities from within the network or may verify access rights of computer facilities from external networks. When network access for a client facility is denied, the network access control may send an information file to the client facility, the information file may contain data or commands that may provide instructions for the remedial action facility 128. The information sent by the network access facility 124 control may be a data file. The data file may contain a number of commands, definitions, instructions, or the like to be parsed and acted upon through the remedial action facility 128, or the like. The information sent by the network access facility 124 control may be a command or command file that the remedial action facility 128 may access and take action upon.

In an embodiment, the network access rules 124 may provide an information store to be accessed by the network access control. The network access rules facility 124 may include databases such as a block list, a black list, an allowed list, a white list, an unacceptable network site database, an acceptable network site database, a network site reputation database, or the like of network access locations that may or may not be accessed by the client facility. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites, controlling instant messenger accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the enterprise facility 102. The network access rules facility 124 may be maintained by the network administration facility 134, using network access rules facility 124 management. In an embodiment, the network administration facility 134 may be able to maintain a set of access rules manually by adding rules, changing rules, deleting rules, or the like. Additionally, the administration facility 134 may be able to retrieve predefined rule sets from a provider that may provide a set of rules to be applied to an entire enterprise facility 102. The network administration facility 134 may be able to modify the predefined rules as needed for a particular enterprise facility 102 using the network access rules management facility 124.

When a threat or policy violation is detected by the threat management facility 100, the threat management facility 100 may provide for a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility, quarantine of the application, terminating the application, isolation of the application, isolation of the client facility to a location within the network that restricts network access, blocking a network access port from a client facility, reporting the application to an administration facility 134, or the like.

Remedial action may be provided as a result of a detection of a threat or violation. The detection techniques facility 130 may include monitoring the enterprise facility 102 network or endpoint devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility, and the like. This may provide the capability of not allowing a streaming file or portions of the streaming file containing malicious code from entering the client facility, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility computing facilities on a network. The administration facility 134 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 134. The administration facility 134 may be able to determine the level of preparedness of the client facility computing facilities by the reported information. Remedial action may be taken for any of the client facility computing facilities as determined by the administration facility 134; remedial action may be taken by the administration facility 134 or by the user of the client facility.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility, server facility 142, administration facility 134, firewall 138, gateway, hubs and routers 148, threat management appliance 140, desktop users, mobile users, and the like. In embodiments, it may be the endpoint computer security facility 152, located on a computer's desktop, which may provide threat protection to a user, and associated enterprise facility 102. In embodiments, the term endpoint may refer to a computer system that may source data, receive data, evaluate data, buffer data, or the like (such as a user's desktop computer as an endpoint computer), a firewall as a data evaluation endpoint computer system, a laptop as a mobile endpoint computer, a PDA or tablet as a hand-held endpoint computer, a mobile phone as an endpoint computer, or the like. In embodiments, endpoint may refer to a source or destination for data, including such components where the destination is characterized by an evaluation point for data, and where the data may be sent to a subsequent destination after evaluation. The endpoint computer security facility 152 may be an application loaded onto the computer platform or computer support component, where the application may accommodate the plurality of computer platforms and/or functional requirements of the component. For instance, a client facility computer may be one of a plurality of computer platforms, such as Windows, Macintosh, Linux, and the like, where the endpoint computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs and routers 148, server facility 142, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility computing platforms on which the endpoint computer security facility 152 is adapted. A client facility computing platform may be a computer system that is able to access a service on another computer, such as a server facility 142, via a network. This client facility server facility 142 model may apply to a plurality of networked applications, such as a client facility connecting to an enterprise facility 102 application server facility 142, a web browser client facility connecting to a web server facility 142, an e-mail client facility retrieving e-mail from an Internet 154 service provider's mail storage servers 142, and the like. In embodiments, traditional large client facility applications may be switched to websites, which may increase the browser's role as a client facility. Clients 144 may be classified as a function of the extent to which they perform their own processing. For instance, client facilities are sometimes classified as a fat client facility or thin client facility. The fat client facility, also known as a thick client facility or rich client facility, may be a client facility that performs the bulk of data processing operations itself, and does not necessarily rely on the server facility 142. The fat client facility may be most common in the form of a personal computer, where the personal computer may operate independent of any server facility 142. Programming environments for fat clients 144 may include CURT, Delphi, Droplets, Java, win32, X11, and the like. Thin clients 144 may offer minimal processing capabilities, for instance, the thin client facility may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility may also be a mix of the two, such as processing data locally, but relying on a server facility 142 for data storage. As a result, this hybrid client facility may provide benefits from both the fat client facility type, such as multimedia support and high performance, and the thin client facility type, such as high manageability and flexibility. In embodiments, the threat management facility 100, and associated endpoint computer security facility 152, may provide seamless threat protection to the plurality of clients 144, and client facility types, across the enterprise facility 102.

The enterprise facility 102 may include a plurality of server facilities 142, such as application servers, communications servers, file servers, database servers, proxy servers, mail servers, fax servers, game servers, web servers, and the like. A server facility 142, which may also be referred to as a server facility 142 application, server facility 142 operating system, server facility 142 computer, or the like, may be an application program or operating system that accepts client facility connections in order to service requests from clients 144. The server facility 142 application may run on the same computer as the client facility using it, or the server facility 142 and the client facility may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs and routers, gateways, print servers, net modems, and the like. These simple server facility appliances may not require configuration by the enterprise facility 102, but may require protection from threats via an endpoint computer security facility 152. These appliances may provide interconnection services within the enterprise facility 102 network, and therefore may advance the spread of a threat if not properly protected.

One way for a client facility to be protected from threats from within the enterprise facility 102 network may be a personal firewall. A personal firewall may be an application that controls network traffic to and from a client, permitting or denying communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the threat management facility 100.

Another important component that may be protected by an endpoint computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network." Since firewall facilities 138 represent boundaries between threat levels, the endpoint computer security facility 152 associated with the firewall facility 138 may provide resources that may control the flow of threats at this enterprise facility 102 network entry point. Firewall facilities 138, and associated endpoint computer security facility 152, may also be associated with a network node that may be equipped for interfacing between networks that use different protocols. In embodiments, the endpoint computer security facility 152 may provide threat protection in a plurality of network infrastructure locations, such as at the enterprise facility 102 network entry point, i.e. the firewall facility 138 or gateway; at the server facility 142; at distribution points within the network, i.e. the hubs and routers 148; at the desktop of client facility computers; and the like. In embodiments, the most effective location for threat detection may be at the user's computer desktop endpoint computer security facility 152.

The interface between the threat management facility 100 and the enterprise facility 102, and through the appliance facility 140 to embedded endpoint computer security facilities, may include a set of tools that may be the same for all enterprise implementations, but allow each enterprise to implement different controls. In embodiments, these controls may include both automatic actions and managed actions. Automatic actions may include downloads of the endpoint computer security facility 152 to components of the enterprise facility 102, downloads of updates to existing endpoint computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM and VoIP; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities within the enterprise facility 102 may be connected to the enterprise facility 102 network by way of wired network facilities 148A or wireless network facilities 148B. Client facilities connected to the enterprise facility 102 network via a wired facility 148A or wireless facility 148B may receive similar protection, as both connection types are ultimately connected to the same enterprise facility 102 network, with the same endpoint computer security facility 152, and the same threat protected enterprise facility 102 environment. Mobile wireless facility clients 144B-F, because of their ability to connect to any wireless 148B,D network access point, may connect to the Internet 154 outside the enterprise facility 102, and therefore outside the threat-protected environment of the enterprise facility 102. In this instance the mobile client facility (e.g., the clients 144 B-F), if not for the presence of the endpoint computer security facility 152 may experience a malware attack or perform actions counter to enterprise facility 102 established policies. In addition, there may be a plurality of ways for the threat management facility 100 to protect the out-of-enterprise facility 102 mobile client facility (e.g., the clients 144 D-F) that has an embedded endpoint computer security facility 152, such as by providing URI filtering in personal routers, using a web appliance as a DNS proxy, or the like. Mobile client facilities that are components of the enterprise facility 102 but temporarily outside connectivity with the enterprise facility 102 network may be provided with the same threat protection and policy control as client facilities inside the enterprise facility 102. In addition, mobile the client facilities may receive the same interactions to and from the threat management facility 100 as client facilities inside the enterprise facility 102, where the mobile client facilities may be considered a virtual extension of the enterprise facility 102, receiving all the same services via their embedded endpoint computer security facility 152.

Interactions between the threat management facility 100 and the components of the enterprise facility 102, including mobile client facility extensions of the enterprise facility 102, may ultimately be connected through the Internet 154. Threat management facility 100 downloads and upgrades to the enterprise facility 102 may be passed from the firewalled networks of the threat management facility 100 through to the endpoint computer security facility 152 equipped components of the enterprise facility 102. In turn the endpoint computer security facility 152 components of the enterprise facility 102 may upload policy and access requests back across the Internet 154 and through to the threat management facility 100. The Internet 154 however, is also the path through which threats may be transmitted from their source. These network threats 104 may include threats from a plurality of sources, including without limitation, websites, e-mail, IM, VoIP, application software, and the like. These threats may attempt to attack a mobile enterprise client facility (e.g., the clients 144B-F) equipped with an endpoint computer security facility 152, but in embodiments, as long as the mobile client facility is embedded with an endpoint computer security facility 152, as described above, threats may have no better success than if the mobile client facility were inside the enterprise facility 102.

However, if the mobile client facility were to attempt to connect into an unprotected connection point, such as at a secondary location 108 that is not a part of the enterprise facility 102, the mobile client facility may be required to request network interactions through the threat management facility 100, where contacting the threat management facility 100 may be performed prior to any other network action. In embodiments, the client facility's 144 endpoint computer security facility 152 may manage actions in unprotected network environments such as when the client facility (e.g., client 144F) is in a secondary location 108 or connecting wirelessly to a non-enterprise facility 102 wireless Internet connection, where the endpoint computer security facility 152 may dictate what actions are allowed, blocked, modified, or the like. For instance, if the client facility's 144 endpoint computer security facility 152 is unable to establish a secured connection to the threat management facility 100, the endpoint computer security facility 152 may inform the user of such, and recommend that the connection not be made. In the instance when the user chooses to connect despite the recommendation, the endpoint computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning, restricting access to network and local resources, or the like. In embodiments, the endpoint computer security facility 152 may perform specific actions to remediate possible threat incursions or policy violations during or after the unprotected connection.

The secondary location 108 may have no endpoint computer security facilities 152 as a part of its computer components, such as its firewalls 138B, servers 142B, clients 144G, hubs and routers 148C-D, and the like. As a result, the computer components of the secondary location 108 may be open to threat attacks, and become potential sources of threats, as well as any mobile enterprise facility clients 144B-F that may be connected to the secondary location's 108 network. In this instance, these computer components may now unknowingly spread a threat to other components connected to the network.

Some threats may not come directly from the Internet 154, such as from non-enterprise facility controlled mobile devices that are physically brought into the enterprise facility 102 and connected to the enterprise facility 102 client facilities. The connection may be made from direct connection with the enterprise facility's 102 client facility, such as through a USB port, or in physical proximity with the enterprise facility's 102 client facility such that a wireless facility connection can be established, such as through a Bluetooth connection. These physical proximity threats 110 may be another mobile computing device, a portable memory storage device, a mobile communications device, or the like, such as CDs and DVDs, memory sticks, flash drives, external hard drives, cell phones, PDAs, MP3 players, digital cameras, point-to-point devices, digital picture frames, digital pens, navigation devices, tablets, appliances, and the like. A physical proximity threat 110 may have been previously infiltrated by network threats while connected to an unprotected network connection outside the enterprise facility 102, and when connected to the enterprise facility 102 client facility, pose a threat. Because of their mobile nature, physical proximity threats 110 may infiltrate computing resources in any location, such as being physically brought into the enterprise facility 102 site, connected to an enterprise facility 102 client facility while that client facility is mobile, plugged into an unprotected client facility at a secondary location 108, and the like. A mobile device, once connected to an unprotected computer resource, may become a physical proximity threat 110. In embodiments, the endpoint computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Having provided an overall context for threat detection, the description now turns to devices, systems, and methods for detecting and mitigating anti-sandboxing techniques used by malware.

Figure 2:
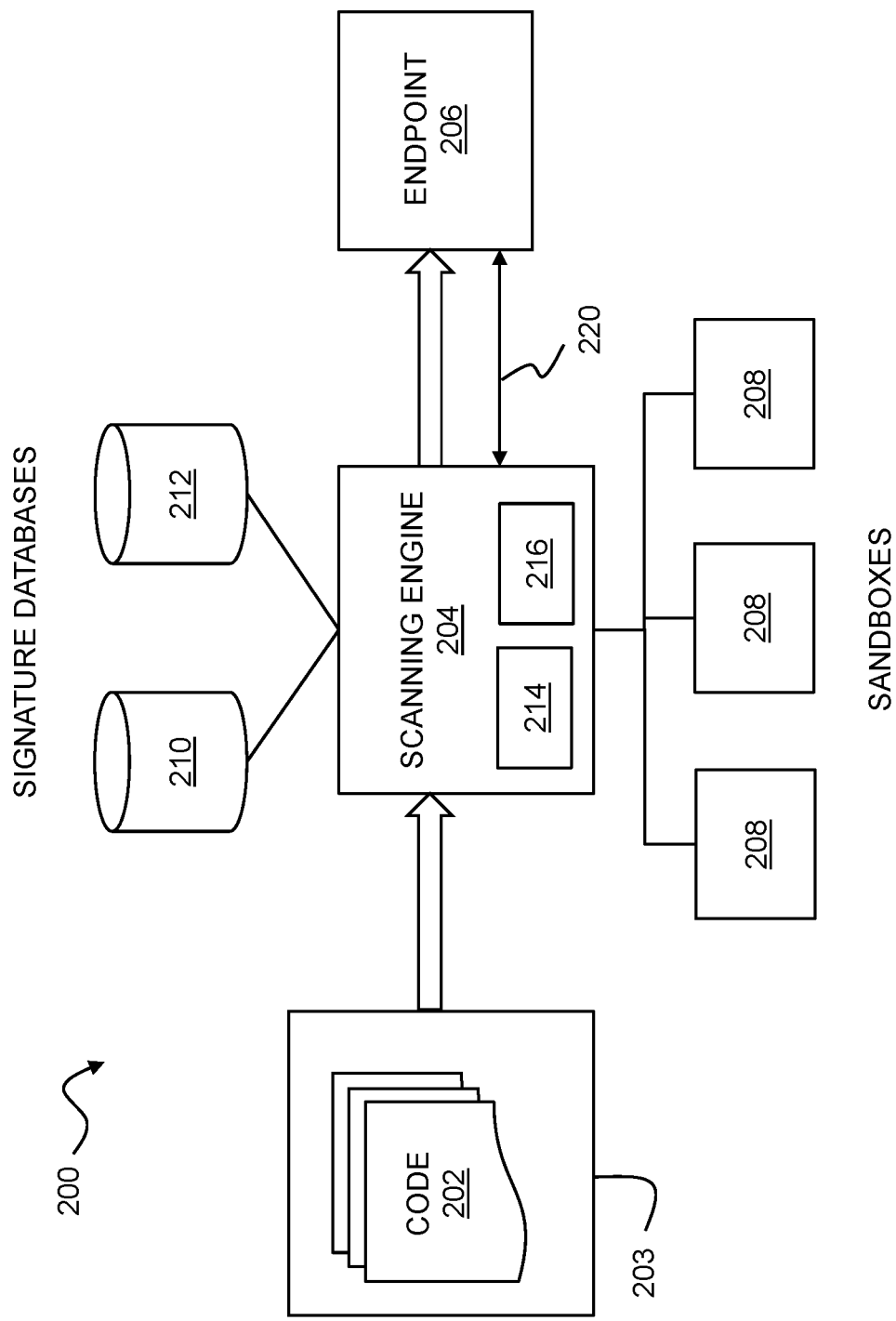
FIG. 2 illustrates an anti-malware system.

FIG. 2 illustrates an anti-malware system. In general, it is known to use a sandbox to analyze unrecognized code by executing the code and looking for malicious behavior. However, this can be slow and computationally expensive. Malware may also use a number of techniques to identify the presence of a sandbox or virtualized environment and alter behavior to avoid detection and analysis. While hardware sandboxes can be used to minimize differences between the sandbox and an ordinary computer environment, this also imposes additional physical and computational costs when compared to software-only solutions.

In general, a system 200 for addressing these issues may include samples 202 of code 203 in an executable object 203, a scanning engine 204 (including a processor 214 and memory 216), an endpoint 206, one or more sandboxes 208, a first signature database 210 containing signature data for static analysis malware detection, and a second signature database 212 containing signature data for static analysis anti-sandbox detection. As described in more detail in the processes below, a scanning engine 204 may generally apply static analysis to the samples 202 of code before forwarding the code 202 to an endpoint 206 for execution.

The samples 202 of code 203 may include any form of executable including byte codes, scripts, compiled or uncompiled code, and so forth. One of the samples 202 may be an entire unit of executable code 203 such as an application or script, or the sample 202 may be a functional or structural subportion of the code 203 suitable for static analysis. The code 203 may be benign code such as legitimate applications, interactive content, and so forth that might be intended for installation on the endpoint 206, or for transitory execution on the endpoint 206 within a web browser or other client software. In another aspect, the code 203 may be malware such as any of the malicious software content described herein.

The scanning engine 204 may include a processor 214 and memory 216 bearing instructions to perform antivirus detection and similar functions. In general, the scanning engine 204 is disposed between an endpoint 206 and a source of the code 203, such as a website, network resource, removable drive, electronic mail message, or the like. This may, for example, include a scanning engine resident on an endpoint, a gateway such as a web gateway or an electronic mail gateway, a firewall, a network switch, a threat management facility, or any other network device or the like positioned between the endpoint and remote resources. The scanning engine 204 may in general apply static analysis or any other suitable techniques, e.g., using signatures in the first signature database 210, to detect known malware signatures in the samples 202 of code 203 so that the scanning engine 204 can prevent malware from reaching the endpoint 206.

The endpoint 206 may, for example, include any of the endpoints described above such as a mobile phone, laptop computer, tablet, desktop computer, server, and so forth. More generally, any device suitable for connection to a data network and participating in an enterprise network or the like may be an endpoint 206 as contemplated herein. In general, an endpoint 206 may be vulnerable to malware that might be received over a network or other communications channel.

The sandboxes 208 may include one or more software sandboxes configured to execute the code 203, or samples of the code 202 in a contained environment so that the endpoint 206 or other enterprise resources are not exposed to harmful or destructive functions of malicious software. Thus, while the scanning engine 204 may generally perform static analysis based on any observable traits of the code 203 or samples 202 thereof, the sandboxes 208 can facilitate dynamic analysis of the code 203 by actually executing the code 203 in a safe environment isolated from endpoints 206 or other enterprise participants. In one aspect, the sandboxes 208 may include virtual sandboxes that can, e.g., be created in a virtual environment on demand as sandbox analysis needs arise. A virtual sandbox may be instrumented to detect various types of malicious behavior typical of malware. The sandboxes may be instrumented more specifically detect at least one known anti-sandbox malware component, or to disguise virtualization by mimicking environmental variables and other characteristics of hardware. In another aspect, the sandboxes 208 may include hardware sandboxes dedicated to code analysis as contemplated herein. In another aspect, as described below, a number of different types of sandboxes may be provided so that the scanning engine 204 can select a specific type of sandbox to analyze sample 202 based on the results of static analysis and any other available information.

The signature databases may include a first signature database 210 containing signatures of known malware so that the scanning engine 204 can perform static analysis of the code 203. The first signature database 210 may be updated periodically as new information about new threats becomes available. It will be understood that while static analysis provides one useful form of malware detection for use by the scanning engine 204, other techniques may also or instead be employed. The second signature database 212 may store different types of signatures, specifically, signatures of known anti-sandbox malware components that are used in malware to avoid detection when executing in a sandbox environment. A simple example of this is code that provides a long delay intended to simply out-wait the sandbox and avoid detection by delaying launch until after a sandbox has stopped analyzing. However other more sophisticated techniques are also known, and may provide code signatures that can be usefully detected using static analysis as contemplated herein. It will be appreciated that the first signature database 210 and the second signature database 212 may be deployed as a single, integrated signature database, although the signatures in each case are directed toward detecting different types of malicious code.

In one aspect, the system 200 may include a communication link 220 for bidirectional communications between the endpoint 206 and the scanning engine 204. This may, for example, include a network connection or, where the scanning engine 204 is resident on the endpoint 206, a software API or the like. In general, the communication link 220 may be used by the scanning engine 204 to query the endpoint 206, e.g., so that the scanning engine 204 can obtain configuration information from the endpoint 206 in order to select or create a suitable sandbox for testing suspected malware as contemplated below, or to forward a software object to the endpoint 206 for execution after scanning has been completed.

Figure 3:
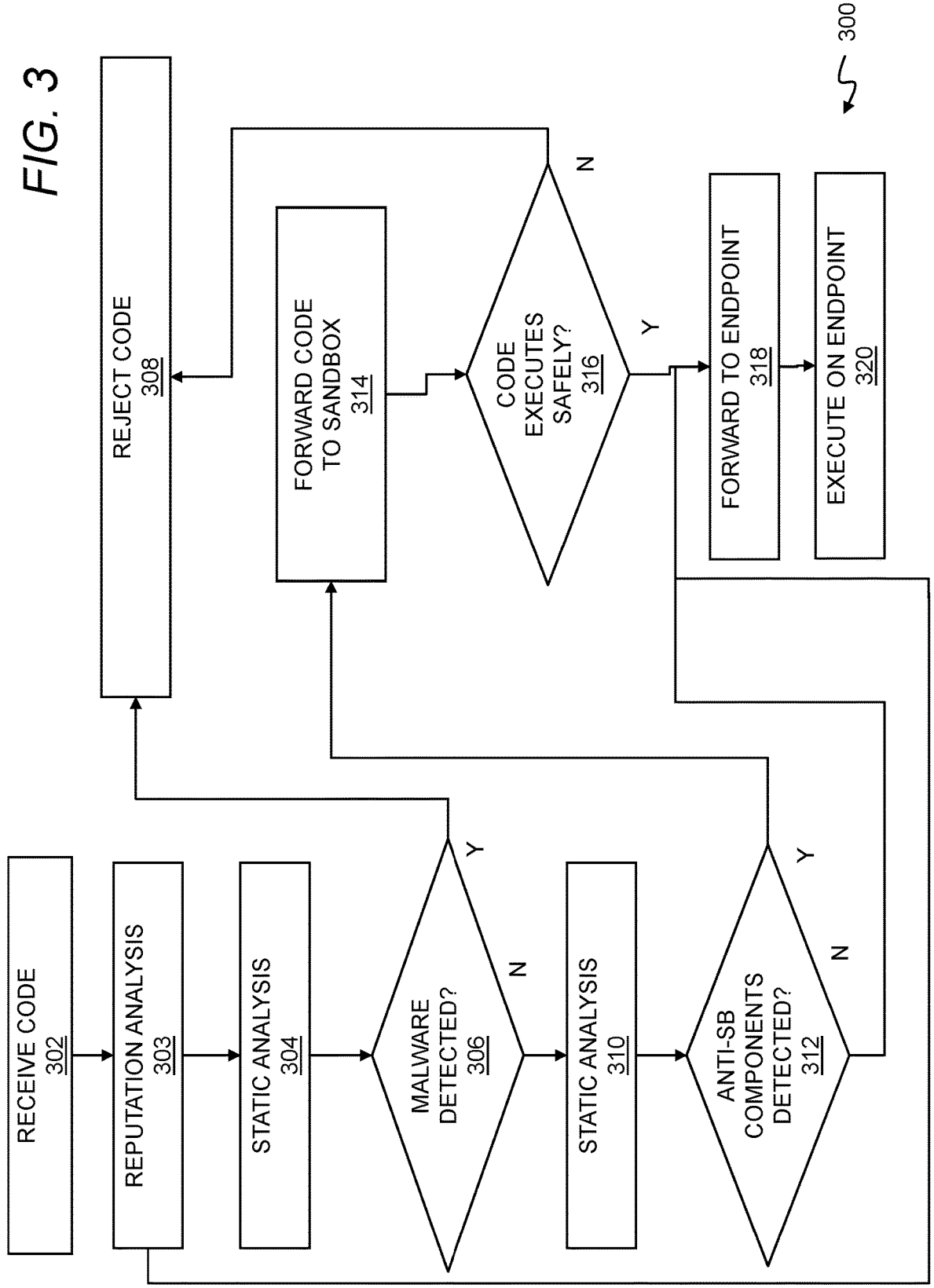
FIG. 3 shows a process for addressing anti-sandboxing malware techniques.

FIG. 3 shows a process for addressing anti-sandboxing malware techniques. The scanning engine and other components described above may be usefully employed in a process 300 as illustrated below for securing an endpoint against malware that contains sandbox detection mechanisms, thus addressing anti-sandboxing techniques of contemporary malware. In general, the process 300 includes a combination of conventional static analysis with supplemental static analysis for anti-sandbox malware components so that computationally expensive sandboxing can be reserved for code that appears to be specifically avoiding sandbox-based detection.

As shown in step 302, the process 300 may begin with receiving a sample of a software object. The software object may be any computer object. For example, the software object may include one or more of a file, a document, an application, a media file, a compressed file or library of files, an electronic mail, an attachment, a script, an application, or any other document, file or item of executable code. The sample may include any portion or subportion of a code object, or an entire, self-contained unit of executable code, all according to the configuration and capabilities of a scanning engine that will perform static analysis. More generally, the sample may include all of the software object or any representative portion of the software object suitable for static analysis as contemplated herein.

As shown in step 303, the process 300 may include performing a reputation analysis of the sample in order to detect a known, safe software object that can be executed on the endpoint without further analysis. This step may usefully be performed prior to the first static analysis, prior to the second static analysis, or at any other time where computing resources might usefully be conserved by pre-identifying safe software components from trusted sources. Reputation analysis may employ any suitable techniques known in the art for identifying safe software and/or trusted source. For example, the reputation analysis may include an analysis of at least one digital signature of the software object that verifies an origin of the software object, or an analysis of a source or sender of the software object. Where a software object is determined to be safe, the process 300 may proceed directly to step 318 where the software object is forwarded to an endpoint as described below. Otherwise the process 300 may proceed to step 304.

As shown in step 304, the process 300 may include performing a first static analysis of the sample using one or more signatures of known malware. This may include any conventional form of static analysis based on signatures or similar file or code features, which may be performed the scanning engine described above, or any other suitable hardware/software.

As shown in step 306, the static analysis may evaluate whether malware is detected based on, e.g., a match between signatures of the sample and signatures in a signature database, or any other suitable static analysis or similar process.

As shown in step 308, when malware is detected in the first static analysis, the method 300 may include rejecting a software object containing the sample for use on the endpoint. This may include deleting the software object, forwarding the software object to a remote resource for further analysis, reporting receipt of the software object to a remote resource, or otherwise recording, analyzing, or reporting on the detection of the malware. When malware is not detected, the process 300 may proceed to step 310.

As shown in step 310, when malware is not detected in the first static analysis, the process 300 may include performing a second static analysis of the sample using one or more signatures of known anti-sandbox components. This may include any signatures of known code components that are used by malware to evade detection specifically when executing in a sandbox environment. For example, this may include one or more byte sequences known to be associated with malware anti-sandbox components or feature vectors known to be associated with malware anti-sandbox components. Other techniques may also or instead usefully be employed to detect anti-sandbox components. For example, any software object or code sample that explicitly searches for files, registry entries, or other objects commonly found in a virtualized environment might be considered suspicious, and suitable signatures may be devised for identifying such code. Similarly, signatures may be devised to detect unusual, undocumented or invalid instruction sequences or API parameters that appear intended to be incorrectly handled within a virtualization environment. More generally, signatures may be provided for instructions or sequences of instructions that are intended to probe an environment for virtualization characteristics. For example, signatures may be devised to detect sequences of operations that will experience significant execution delays in a virtualized environment, that query hardware system information (CPU details, MAC addresses) that do not exist in a virtualized environment, or that request handles for system objects that do not exist under virtualization, or that may not be fully emulated/simulated in a virtual environment. Signatures may also or instead be devised to detect instructions or sequences of instructions that appear intended to delay execution, e.g., to outwait sandbox testing, or that will take significantly different lengths of time inside versus outside virtualization. Still more generally, any code that measures or exploits differences in the configuration or operation of virtualized environments as compared to non-virtualized environments, may usefully serve as the basis for anti-sandbox detection signatures as contemplated herein.

As shown in step 312, the static analysis may evaluate whether a known anti-sandbox component is present. The anti-sandbox component may be any code configured to detect when it is executing in a sandbox and evade detection. This may, for example include a component configured to detect on or more aspects of a virtualized environment or other sandbox environment, and to avoid detection when executing within such a predetermined sandbox environment. When an anti-sandbox component is detected in the second static analysis, the process 300 may include forwarding the sample to a sandbox environment for execution and testing as shown in step 314. In one aspect, this technique may more specifically be used as a filter for using hardware sandboxes. That is, when certain software components are detected, they will be specifically directed to a hardware sandbox, so that static analysis can be effectively applied as a filter for hardware sandboxing. Otherwise the code may be forwarded to an endpoint as shown in step 318.

As shown in step 316, the forwarded code sample received at the sandbox may be evaluated within the sandbox to determine whether the code is malicious.

When no anti-sandbox component is detected, the process may include permitting the software object to be processed on the endpoint. This may generally include forwarding the software object containing the code to the endpoint as shown in step 318, and then executing the software object on the endpoint, as shown in step 320. This may include forwarding the software object from an intermediary such as a firewall, gateway (e.g., an electronic mail gateway or a web gateway), a threat management facility, or other network component that executes the scanning engine for static analysis. Where some or all of the static analysis is performed on the endpoint, this may alternatively include releasing the software object from an antivirus engine or other scanning engine or the like executing on the endpoint.

If the code does not execute safely in step 316, e.g., if some malicious behavior or result is observed, then the process may proceed to step 308 and the code may be rejected. It will be understood that malicious behavior may not be specifically observed in all instances. For example, if an application is observed to launch and then exit quickly without performing any useful function, a strong inference may be made that the code has detected a sandbox and aborted execution. This code may be rejected, or the code may be flagged for further analysis. Where strong indications of malicious behavior are found but not confirmed in this context, the code may be redirected to a hardware sandbox, e.g., using the techniques described below.

It will be appreciated that the size of code samples analyzed within a software object, and the number of signatures applied, may vary according to the granularity of the antivirus system. In some circumstances, it may be appropriate to analyze an entire software object at one time. In other circumstances, it may be appropriate to analyze small, individual samples of code in sequence or in parallel. Similarly, steps may be rearranged, such as by performing sandbox component analysis first, followed by more general malware static analysis, or these steps may be combined into a single signature-based static analysis. Thus the steps may be repeated and/or reorganized as appropriate according to the process flow of a scanning engine and other system components performing the depicted process, and no particular order of these scanning steps should be inferred from the presentation of steps in FIG. 3.

The process described above may also or instead be realized in computer code, or in device or system such as any of those described above configured to perform the steps above. Thus in one aspect, disclosed herein is a computer program product for securing an endpoint against malware that contains sandbox detection mechanisms, the computer program product comprising computer executable code embodied in a non-transitory computer readable medium that, when executing on one or more computing devices, performs the steps of receiving a sample of a software object over the network, performing a first static analysis of the sample using one or more signatures of known malware, when malware is detected in the first static analysis, rejecting a file containing the sample for use on the endpoint, when malware is not detected in the first static analysis, performing a second static analysis of the sample using one or more signatures of known anti-sandbox components, when an anti-sandbox component is detected in the second static analysis, forwarding the sample to a sandbox environment for execution and testing, and when no anti-sandbox component is detected, permitting the software object to be processed on the endpoint.

In another aspect, disclosed herein is a system for securing an endpoint against malware that contains sandbox detection mechanisms, the system including a computing device coupled to a network; a processor; and a memory bearing computer executable code configured to be executed by the processor to cause the computing device to perform the steps of receiving a sample of a software object over the network, performing a first static analysis of the sample using one or more signatures of known malware, when malware is detected in the first static analysis, rejecting a file containing the sample for use on the endpoint, when malware is not detected in the first static analysis, performing a second static analysis of the sample using one or more signatures of known anti-sandbox components, when an anti-sandbox component is detected in the second static analysis, forwarding the sample to a sandbox environment for execution and testing, and when no anti-sandbox component is detected, permitting the software object to be processed on the endpoint.

Figure 4:
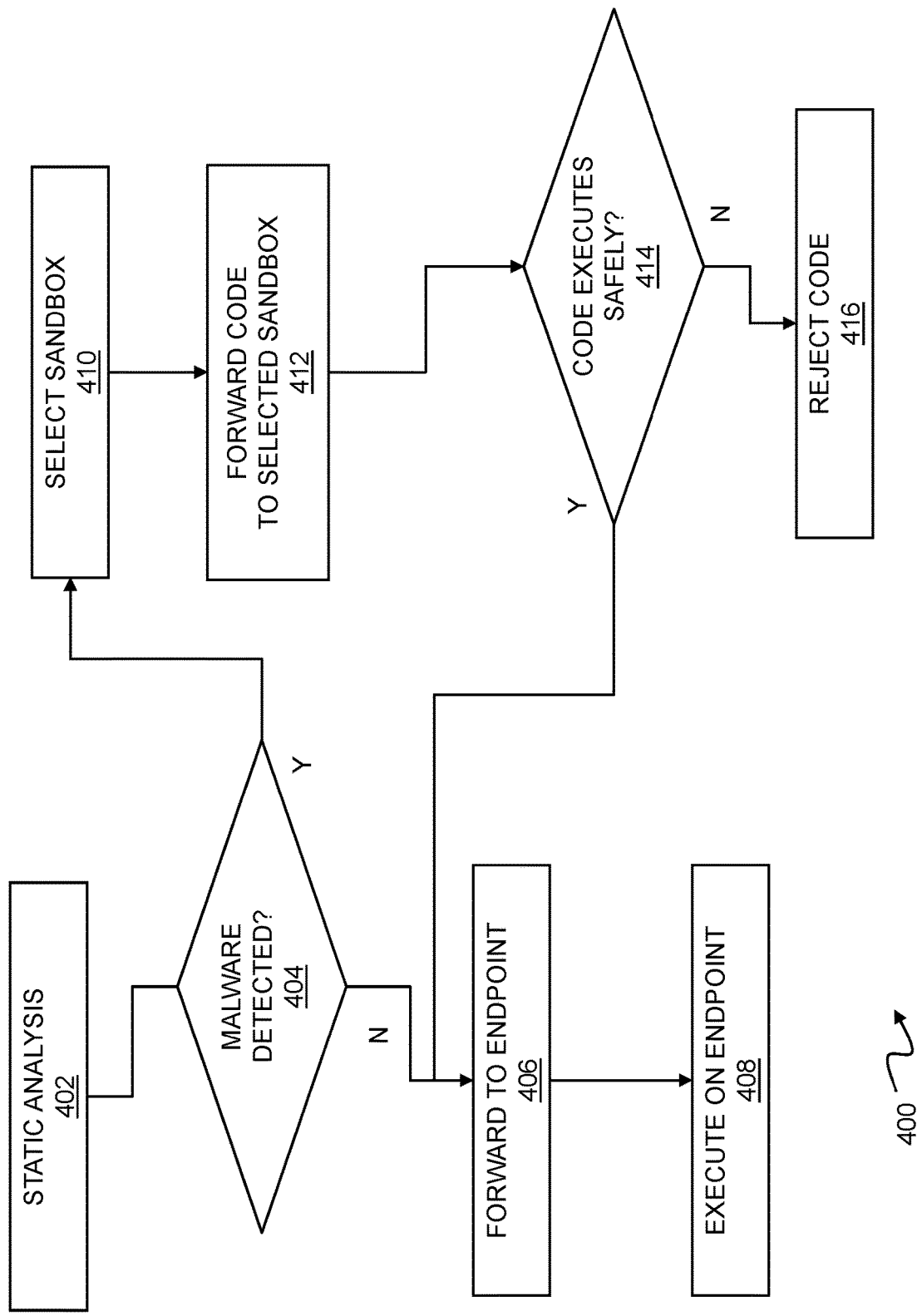
FIG. 4 shows a process for addressing anti-sandboxing malware techniques.

FIG. 4 shows a process for addressing anti-sandboxing malware techniques. While the above process contemplates the use of static analysis to detect known anti-sandbox components, the process may be further enhanced by using static analysis to select a specific type of sandbox for further analysis. Thus for example, in some instances where a particular vulnerability is likely being exploited, a specifically-tailored virtual sandbox environment may be created to examine a particular behavior, while in other instances where the virtualization environment itself may be detected, a physical sandbox may instead be deployed to test the suspicious code.

As shown in step 402, the process 400 may begin with performing a static analysis of a sample of a software object using one or more signatures of one or more known malware objects, such as known malicious code or code containing anti-sandbox features. In general, static analysis may be applied to identify known malware based on feature vectors, signatures, or the like. The static analysis may also or instead include static analysis on unrecognized software objects based on patterns or arrangements of code that appear suspicious. Thus any known malware object, or recognizable pattern of potentially malicious components, may be used as a basis for performing static analysis. For example, a known malware object may include a virtual environment detection component, a sandbox detection component, a hardware-specific exploit, a software-specific exploit, or any combination of these. Similarly, the known malware object may include an operating system exploit, an application exploit, or any other exploit that capitalizes on potential vulnerabilities in hardware, a kernel, an operating system, an application, or some combination of these. The detection of these and other suspicious patterns may be used as a basis for further action as contemplated herein.

A computing device receiving the software object may be coupled to a network and the software object may be received over the network, such as from a gateway, firewall, switch, remote server, or other network resource. In another aspect, the software object may be received locally such as from a flash drive or other removable or portable memory device that is coupled to a computer, or through a short range wireless communication interface using, e.g., radio frequency, infrared, or any other optical, acoustic, or electrical communication medium. For example, Bluetooth is a short range, radio frequency communication standard that might usefully be employed to transfer files among devices, and may be a source of a software object received on a computer or computing device.

As shown in step 404 the static analysis may determine if malware is detected. In this context, malware may include specific instances of known malware, or malware may include, e.g., code characteristic of anti-sandbox techniques or the like that is suspected of being malware and requiring additional analysis.

If malware is not detected in step 404, then the process may include forwarding the software object to an endpoint as shown in step 406. As described above, this may include forwarding the software object from a remote location such as a firewall, gateway, or the like, or this may include releasing the software object from a scanning engine executing on the endpoint. In either case, the process 400 may include executing the software object on the endpoint as shown in step 408. If during step 404 malware or potential malware is detected, then the process 400 may proceed to step 410.

As shown in step 410, the process 400 may include selecting from among a plurality of available sandbox environments to process the software object for malware testing (by executing the software object in the sandbox). The plurality of available sandbox environments may include any number and configuration of sandboxes. For example, the available sandbox environments may include a hardware sandbox, a sandbox with a predetermined operating system, a sandbox with a predetermined software configuration, a virtual sandbox instrumented to detect at least one known anti-sandbox component, or any other sandbox environment or the like that is tailored to a particular type of malware detection, as well as any combination of the foregoing. In one aspect, sandboxes may be provided for different hardware platforms, such as desktop computers, laptop computers, smart phones, and tablets, or with still more granularity for different devices such as Android phones, Apple phones, and Windows phones. Similarly, sandboxes may be provided for different file types or application versions. For example, where static analysis identifies what appears to be a known exploit for a particular version of an application, a virtual environment with that specific version of the application may be instantiated and used to open the suspicious software object.

In one aspect, a number of different sandboxes may be applied in sequence. That is, where a particular software object cannot confidently be categorized as safe or unsafe, the code may be transferred to another sandbox for further testing. Thus for example, a virtual sandbox may be applied first, and then a (more expensive) hardware sandbox may be used next if the code contains anti-sandbox signatures, but did not exhibit any anti-sandbox or other malicious behavior in a particular virtualized sandbox environment. In this manner, the most expensive resources may be conserved for those cases that require a particular environment, e.g., a hardware sandbox, for proper identification.

As shown in step 412, after a suitable sandbox has been selected, the process 400 may include forwarding the software object to the selected sandbox. As shown in step 414, the code may be observed while executing in the sandbox to determine whether the code executes safely. If the code executes safely, then the process 400 may proceed to step 406 where the software object is forward to an endpoint for execution.

As shown in step 416, if the software object does not execute safely, then the software object may be rejected. This may include any number of additional analysis or handling steps. For example, the process 400 may optionally return to step 410 where a different sandbox may be selected, particularly where the code analysis is inconclusive. In another aspect, where the code is rejected, the code may further be flagged and/or forwarded to an analysis facility for further processing, the development of new signatures for improved downstream detection, and so forth. More generally, any techniques useful for handling, cataloguing, mitigating, or otherwise dealing with rejected code may be applied in step 416 as contemplated herein.

Figure 5:
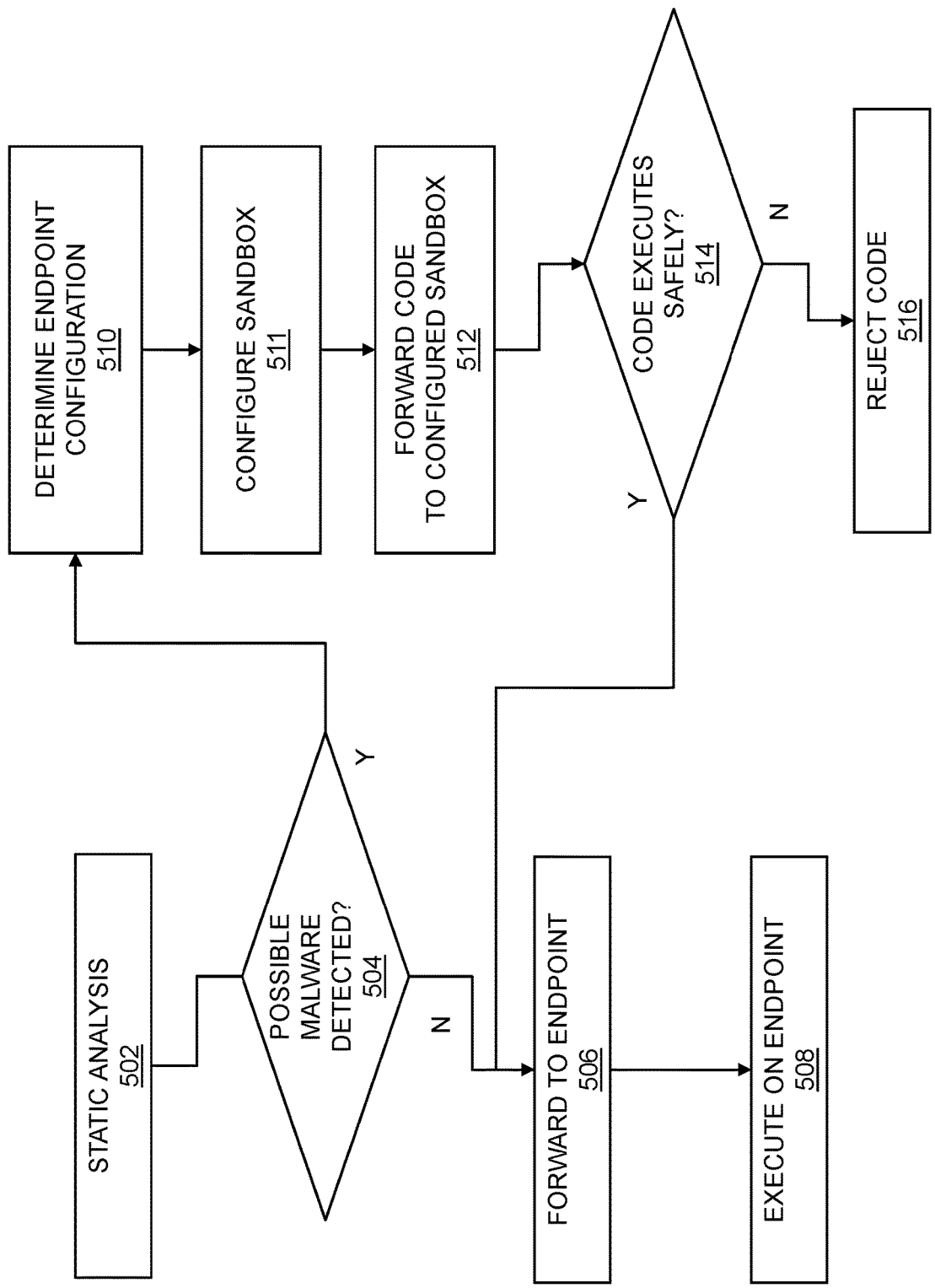
FIG. 5 shows a process for configuring a sandbox for malware testing to correspond to a target endpoint.

FIG. 5 shows a process for configuring a sandbox for malware testing to correspond to a target endpoint. In general, this process 500 may proceed as described above with reference to FIG. 4, except that a sandbox is configured to specifically match a target endpoint in order to improve chances for detection of relevant malicious behavior. Thus for example, in some instances where a particular vulnerability of a particular platform is likely being exploited, a specifically-tailored virtual sandbox environment may be created to match the target environment.

As shown in step 502, the process 500 may begin with performing a static analysis of a sample of a software object using one or more signatures of one or more suspected malware objects, such as known or suspected malicious code or code containing identifiable features of malware. In general, static analysis may be applied to identify known or suspected malware based on feature vectors, signatures, or the like. The static analysis may also or instead include static analysis on unrecognized software objects based on patterns or arrangements of code that appear suspicious. Thus any known malware object, or recognizable pattern of potentially malicious components, may be used as a basis for performing static analysis. For example, a known malware object may include a virtual environment detection component, a sandbox detection component, a hardware-specific exploit, a software-specific exploit, or any combination of these. Similarly, the known malware object may include an operating system exploit, an application exploit, or any other exploit that capitalizes on potential vulnerabilities in hardware, a kernel, an operating system, an application, or some combination of these. The detection of these and other suspicious patterns may be used as a basis for further action as contemplated herein.

A computing device receiving the software object may be coupled to a network and the software object may be received over the network, such as from a gateway, firewall, switch, remote server, or other network resource. In another aspect, the software object may be received locally such as from a flash drive or other removable or portable memory device that is coupled to a computer, or through a short range wireless communication interface using, e.g., radio frequency, infrared, or any other optical, acoustic, or electrical communication medium. For example, Bluetooth is a short range, radio frequency communication standard that might usefully be employed to transfer files among devices, and may be a source of a software object received on a computer or computing device.

As shown in step 504 the static analysis may determine if malware is detected. In this context, malware may include specific instances of known malware, or malware may include, e.g., code characteristic of anti-sandbox techniques or the like that is suspected of being malware and requiring additional analysis.

If malware is not detected in step 504, then the process may include forwarding the software object to an endpoint as shown in step 506. As described above, this may include forwarding the software object from a remote location such as a firewall, gateway, or the like, or this may include releasing the software object from a scanning engine executing on the endpoint. In either case, the process 500 may include executing the software object on the endpoint as shown in step 508. If during step 504 malware or any possible malware object is detected, then the process 500 may proceed to step 510.

As shown in step 510, the process 500 may include determining a configuration of a target endpoint for the software object. This may, for example, include querying the target endpoint for configuration information, or using any other techniques to determine a configuration of the endpoint such as by requesting information stored in a threat management facility or other repository of configuration information, software updates, and the like for an enterprise. More generally, any technique for directly or indirectly determining the configuration of an endpoint may be used. The configuration may, for example include an operating system configuration, a hardware configuration, an application configuration, and so forth. Other information may also usefully by detected and reproduced in order to create an environment more closely matching a target endpoint, such as a MAC address, an IP address, and so forth. This information may be passed to a sandbox environment as context data, or may be used to create a new sandbox.

As shown in step 511, the process 500 may include configuring a sandbox to match the configuration of the target endpoint. This may include creating a new sandbox (e.g., a new virtual machine) corresponding to the configuration of the target endpoint, or dynamically configuring an existing sandbox environment to replicate the target endpoint. Where an existing sandbox is dynamically configured, this may, for example, include installing software on a preexisting virtual machine to match a software configuration of the target endpoint including, without limitation, installed applications, an operating system and updates to same, and so forth. Where a hardware sandbox is desired, the hardware sandbox may be similarly configured dynamically to more closely correspond to the environment of the target endpoint.

It should be appreciated that this technique may also or instead be used in combination with the process 400 described above with reference to FIG. 4. That is, after a configuration of the target endpoint has been determined, this information may be used to select from among a number of preexisting sandboxes—preferably one most closely matching the target environment—rather than instantiating a new sandbox according to characteristics of the target endpoint. In either case, a suitable sandbox may be created or selected as contemplated herein.

As shown in step 512, after a suitable sandbox has been instantiated, the process 500 may include forwarding the software object to the created sandbox. As shown in step 514, the code may be observed while executing in the sandbox to determine whether the code executes safely. If the code executes safely, then the process 500 may proceed to step 506 where the software object is forward to an endpoint for execution.

As shown in step 516, if the software object does not execute safely, then the software object may be rejected. This may include any number of additional analysis or handling steps. For example, the process 500 may optionally return to step 510 where a different sandbox may be or created, particularly where the code analysis is inconclusive. In another aspect, where the code is rejected, the code may further be flagged and/or forwarded to an analysis facility for further processing, the development of new signatures for improved downstream detection, and so forth. More generally, any techniques useful for handling, cataloguing, mitigating, or otherwise dealing with rejected code may be applied in step 516 as contemplated herein.

The process described above may also or instead be realized in computer code, or in device or system such as any of those described above configured to perform the steps above. Thus in one aspect, disclosed herein is a computer program product comprising computer executable code embodied in a non-transitory computer readable medium that, when executing on one or more computing devices, performs the steps of performing a static analysis of a sample of a software object using one or more signatures of one or more known malware objects, and when the static analysis identifies one of the one or more known malware objects, selecting a sandbox environment from among a plurality of available sandbox environments to process the software object for malware testing.

In another aspect, a system disclosed herein includes a computing device coupled to a network, a processor, and a memory bearing computer executable code configured to be executed by the processor to cause the computing device to perform the steps of receiving the software object over a network, performing a static analysis of a sample of a software object using one or more signatures of one or more known malware objects, and when the static analysis identifies one of the known malware objects, selecting a sandbox environment from among a plurality of available sandbox environments to process the software object for malware testing. The computing device may be any enterprise device or the like. For example, the computing device may be an electronic mail gateway to an enterprise network that receives electronic mail and applies static analysis before forward messages to endpoints. The computing device may also or instead include a firewall to an enterprise network, a threat management facility for the enterprise network, or any other participant in an enterprise network. In one aspect, the computing device may be an endpoint in the enterprise network, and may locally execute signature-based analysis to select an appropriate sandbox for unrecognized but suspicious malware.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method for configuring a sandbox for malware testing, the method comprising:
   analyzing, at a threat management facility, at least one digital signature of a software object for a target endpoint to detect a known, trusted software object that can be executed without further analysis, the at least one digital signature verifying an origin of the software object;
   when the software object is determined to be trusted, proceeding directly to forwarding the software object from the threat management facility to an endpoint; and
   when the software object is determined, based on the digital signature, to be other than trusted, performing, at the threat management facility, the steps of:
      sending, to a repository of configuration information of an enterprise, a request for configuration information of the target endpoint for the software object;
      receiving, in response to the request, the configuration information of the target endpoint for the software object;
      configuring the sandbox to match the configuration information of the target endpoint for the software object, the sandbox instrumented to detect a known anti-sandbox malware component and the sandbox configured to disguise virtualization of the sandbox by mimicking at least one environmental variable of the target endpoint; and
      forwarding the software object to the sandbox for execution.

2. The method of claim 1, further comprising monitoring execution of the software object in the sandbox for a presence of a malicious action.

3. The method of claim 1, wherein the configuration information includes an application configuration.

4. The method of claim 1, wherein the configuration information includes an operating system configuration.

5. The method of claim 1, wherein the configuration information includes a hardware configuration.

6. The method of claim 1, wherein configuring the sandbox includes creating a new virtual machine corresponding to the configuration information of the target endpoint.

7. The method of claim 1, wherein configuring the sandbox includes installing software on a preexisting virtual machine to match a software configuration of the target endpoint.

8. A computer program product for configuring a sandbox for malware testing, the computer program product comprising computer executable code embodied in a non-transitory computer readable medium that, when executing on one or more computing devices, performs the steps of:
   analyzing, at a threat management facility, at least one digital signature of a software object for a target endpoint to detect a known, trusted software object that can be executed without further analysis, the at least one digital signature verifying an origin of the software object;
   when the software object is determined to be trusted, proceeding directly to forwarding the software object from the threat management facility to an endpoint; and
   when the software object is determined, based on the digital signature, to be other than trusted, performing, at the threat management facility, the steps of:

sending, to a repository of configuration information of an enterprise, a request for configuration information of the target endpoint for the software object;

receiving, in response to the request, the configuration information of the target endpoint for the software object;

configuring the sandbox to match the configuration information of the target endpoint for the software object, the sandbox instrumented to detect a known anti-sandbox malware component and the sandbox configured to disguise virtualization of the sandbox by mimicking at least one environmental variable of the target endpoint; and forwarding the software object to the sandbox for execution.

9. The computer program product of claim 8, further comprising code that performs the step of monitoring execution of the software object in the sandbox for a presence of a malicious action.

10. The computer program product of claim 8, wherein the configuration information includes an application configuration.

11. The computer program product of claim 8, wherein the configuration information includes an operating system configuration.

12. The computer program product of claim 8, wherein the configuration information includes a hardware configuration.

13. The computer program product of claim 8, wherein configuring the sandbox includes creating a new virtual machine corresponding to the configuration of the target endpoint.

14. The computer program product of claim 8, wherein configuring the sandbox includes installing software on a preexisting virtual machine to match the configuration information of the target endpoint.

15. A system comprising:
a computing device coupled to a network, the computing device including a threat management facility;
a processor; and
a memory bearing computer executable code configured to be executed by the processor to cause the computing device to perform the steps of analyzing, at the threat management facility, at least one digital signature of a software object for a target endpoint to detect a known, trusted software object that can be executed without further analysis, the at least one digital signature verifying an origin of the software object, when the software object is determined to be trusted, proceeding directly to forwarding the software object from the threat management facility to an endpoint, and when the software object is determined, based on the digital signature, to be other than trusted, performing, at the threat management facility, the steps of sending, to a repository of configuration information of an enterprise, a request for configuration information of the target endpoint for the software object, receiving, in response to the request, the configuration information of the target endpoint for the software object, configuring a sandbox to match the configuration information of the target endpoint for the software object, the sandbox instrumented to detect a known anti-sandbox malware component and the sandbox configured to disguise virtualization by mimicking at least one environmental variable of the target endpoint, and forwarding the software object to the sandbox for execution.

16. The system of claim 15, wherein the configuration information includes one or more of an application configuration, an operating system configuration, and a hardware configuration.

17. The system of claim 15, wherein configuring the sandbox includes creating a new virtual machine corresponding to the configuration information of the target endpoint.

* * * * *